Aug. 21, 1934.    F. C. GEIBIG    1,971,001
PREHEATING FLAME STABILIZER FOR CUTTING BLOWPIPES
Filed April 19, 1932    2 Sheets-Sheet 1
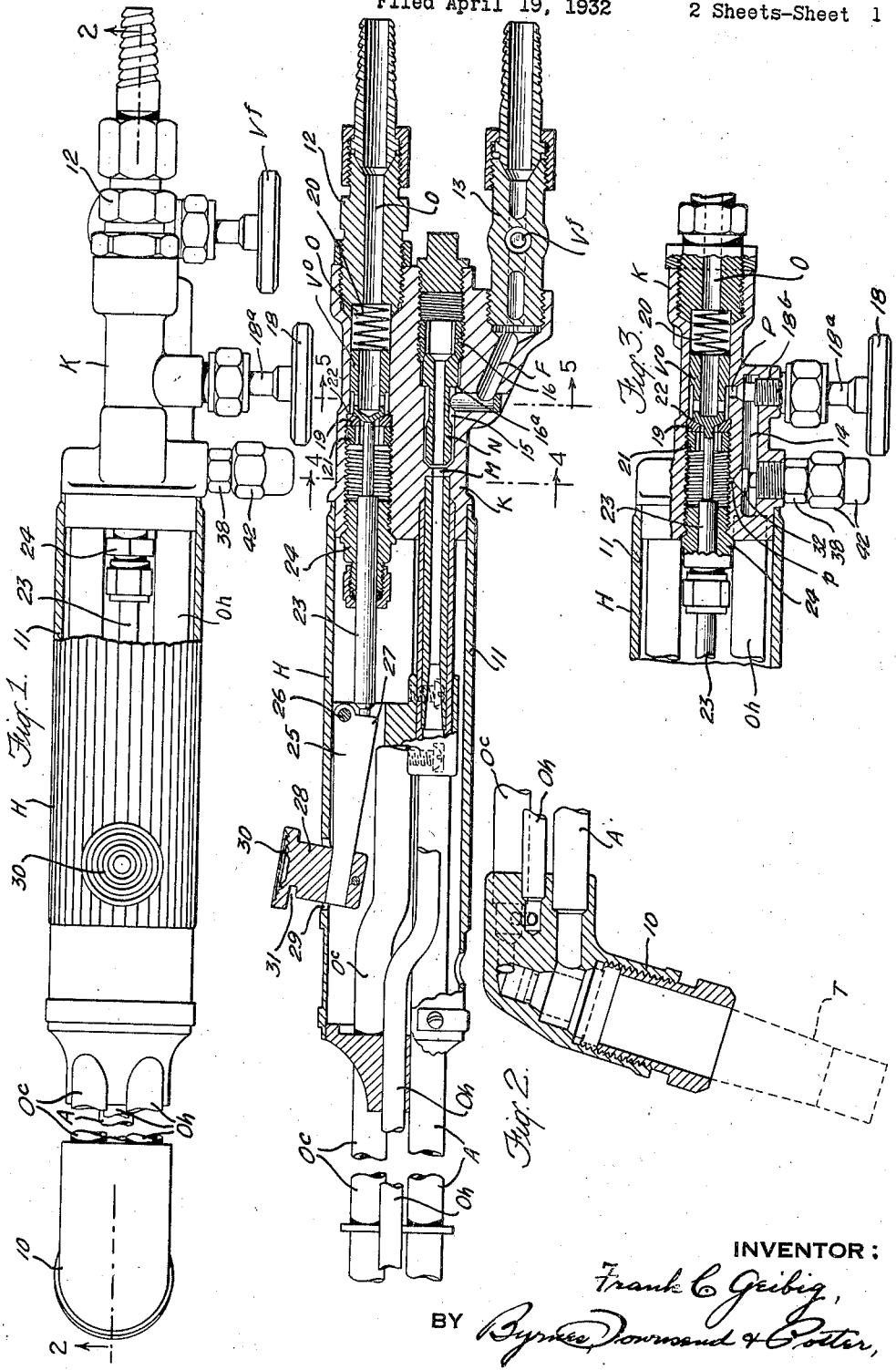
INVENTOR:
Frank C. Geibig,
BY Byrnes, Townsend & Potter,
ATTORNEYS.

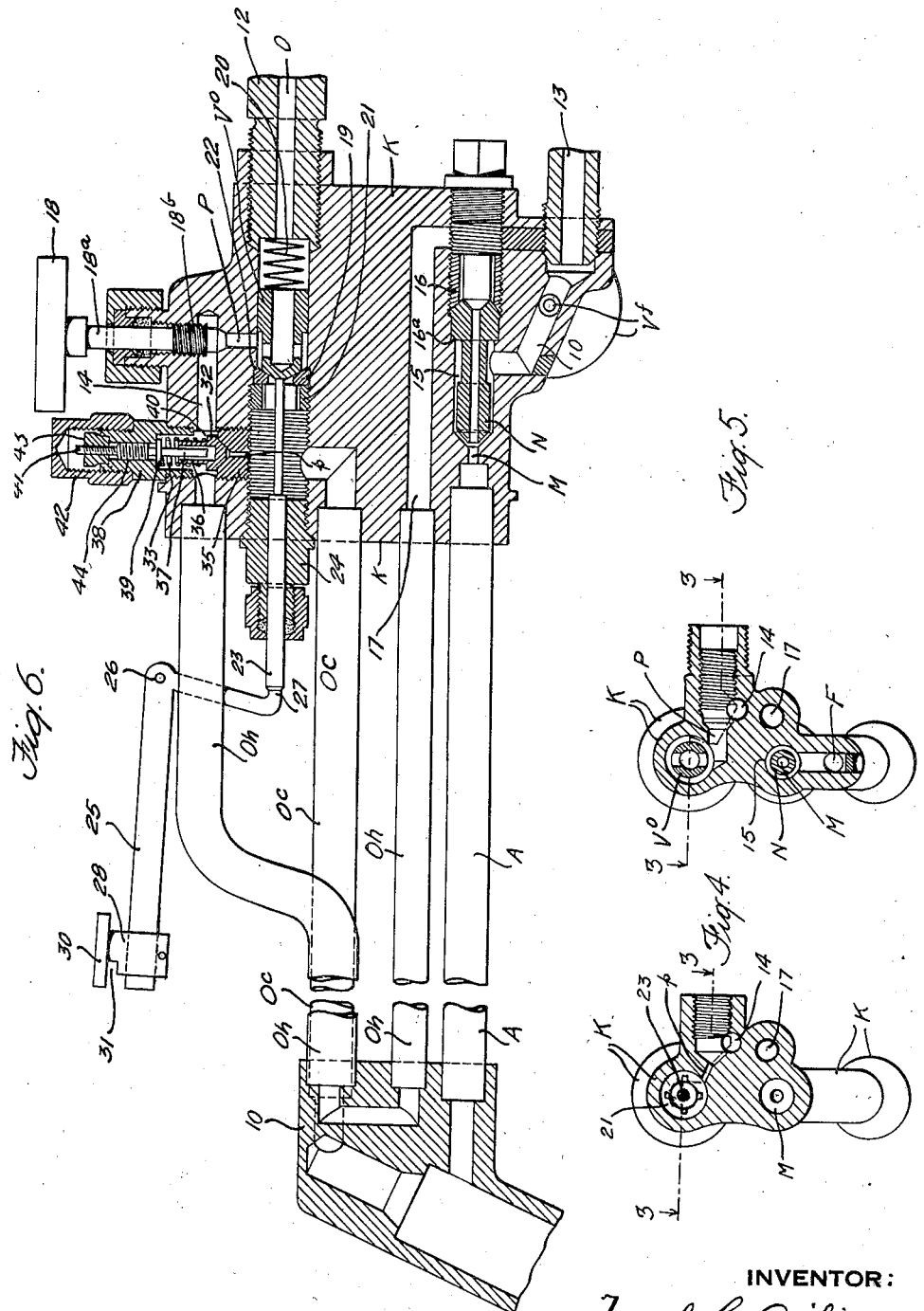

Patented Aug. 21, 1934

1,971,001

UNITED STATES PATENT OFFICE 1,971,001

PREHEATING FLAME STABILIZER FOR CUTTING BLOWPIPES

Frank C. Geibig, Buffalo, N. Y., assignor to Oxweld Acetylene Company, a corporation of West Virginia Application April 19, 1932, Serial No. 606,250

13 Claims. (Cl. 158—27.4)

This invention relates to blowpipes and particularly to oxy-gas blowpipes for use in cutting by means of a preheating flame and oxygen jet and, in which, the cutting oxygen and that for supporting combustion of the preheating gas is supplied from a common source. The invention is an improvement upon that disclosed in the copending application of R. J. Kehl, Ser. No. 602,332, filed March 31, 1932.

In blowpipes of this character, the fuel gas is supplied through a passage to a mixing chamber where it is mingled with oxygen conducted to the chamber by a branch passage constituting an offtake from a main passage from the source of oxygen supply. Flow of oxygen from the main oxygen passage to the cutting tip of the blowpipe is through a passage controlled by a valve ordinarily located between the branch passage and the cutting tip which valve, when opened, robs the branch passage of oxygen causing the pressure therein to drop. When the valve is again closed, this pressure is, of course, restored and thus it will appear that the opening and closing of the cutting oxygen control valve causes a variation in the pressure and density and hence in the quantity of the oxygen supplied to the mixing chamber in unit time; the same decreasing with the opening of the valve and increasing with the closing thereof. Under these conditions, if the valves controlling the oxygen and fuel supply to the mixing chamber are originally set for a neutral mixture with the control valve for the cutting oxygen closed, opening of this latter valve will cause the preheating flame to become carbonizing. On the other hand, if the preheating flame is originally adjusted to neutral with the cutting oxygen control valve open, upon closing this valve, the flame will become oxidizing. Neither of these conditions is desirable in a cutting operation, since excess of carbon robs the flame of heat value and thereby slows the cutting operation while a strongly oxidizing flame has a relatively poor flashback resistance.

It is an object of this invention, therefore, to provide improved means in a cutting blowpipe whereby the preheating flame thereof may be dependably maintained neutral.

A further object of the invention is to provide, in a blowpipe having a plurality of passages for feeding gases to a tip, improved means whereby the flow of gas in one of the passages is under automatic control of that in another passage.

A still further object of the invention is to provide, in a cutting blowpipe having a plurality of passages for conducting gases to a tip and means for diverting a portion of the gas from one of the passages to another for mixing with the gas in the latter, improved means whereby the quantity of gas so diverted will be maintained constant regardless of variations in pressure within the passage from which the gas is diverted.

In accordance with this invention, the quantitative supply of oxygen to the fuel passage in apparatus of the above character may be maintained constant and the preheating flame therefore neutral by provision of means whereby the volume of oxygen passed from the main oxygen passage to the fuel passage is varied in such inverse ratio to the pressure and density of gas within the main oxygen passage on the intake side of the valve in control thereof, that the actual quantity of gas so passed in unit time will be unvaried. Such means may comprise a port on the intake and another on the delivery side of the valve controlling the flow of oxygen through the main oxygen passage; said ports providing communication between the main oxygen passage and the branch passage leading to the mixing chamber. The port on the intake side of said valve is preferably controlled by a throttle valve and that on the delivery side is controlled by a check valve normally held yieldably closed as by a spring, the compression of which is adjustable so that said check valve will be opened automatically by a rise in pressure above a predetermined normal on the delivery side of the valve controlling flow of oxygen through the main oxygen passage.

The above and other objects and novel features of the invention will become apparent from the following specifications taken with the accompanying drawings, in which Fig. 1 is a plan view of a blowpipe with the mechanism of this invention applied thereto.

Fig. 2 is a vertical longitudinal sectional view through the blowpipe, on line 2—2 Fig. 1 showing the arrangement of passages and conduits connecting therewith.

Fig. 3 is a view in horizontal section through a fragment of the blowpipe handle showing the connection on the main oxygen passage to the branch passage by ports and the relation of the control valves to said ports; the view being taken on the line 3—3, Figs. 4 and 5.

Figs. 4 and 5 are cross-sectional views respectively, on lines 4—4 and 5—5, Fig. 2, showing the relation of the main oxygen passage to the branch oxygen passage and, respectively, showing the relation to said passages of the communicating ports therebetween.

Fig. 6 is a more or less diagrammatic sectional view taken longitudinally through a blowpipe illustrating the principles of the invention.

The invention as illustrated in the accompanying drawings is applied to a cutting blowpipe although the same is applicable to any analogous device in which it is desired to regulate the flow of fluid through one conduit by means of that flowing in another conduit.

The blowpipe as shown is comprised of a head 10 having the customary tip T attached thereto; the head being connected with a handle H by conduits A, $O^h$, $O^c$. The handle includes a tubular casing 11 and a valve block in the nature of a casting K secured in the rear end thereof; which casting is suitably bored to provide a main oxygen passage O and a fuel passage F respectively connected with sources of oxygen and fuel supply (not shown) through tubes 12 and 13. The conduit $O^c$ constitutes a continuation of the main oxygen passage as does also conduit A of the fuel gas passage and these conduits serve respectively to conduct cutting oxygen and a combustible gaseous mixture to the head to provide a cutting and a preheating jet at the end of tip T. A passage 15 is also provided in the valve block and may be considered as a part of passage F; the same being provided at its forward end with a mixing chamber M which discharges into the conduit A. The passage 15 serves to house an injector nozzle N which is suitably bored for the passage of oxygen therethrough and has an enlargement at its rear end which is held in passage 15 between a shoulder $16^a$ and an annular locking screw 16. Between the enlargement and its forward end, the nozzle is formed of smaller external diameter than the passage 15 thereby providing a channel for the fuel gas between passage F and the mixing chamber.

Oxygen is supplied to the bore in the nozzle N from the main oxygen passage O and is conducted thereto, in normal operation, through passage 14 constituting a branch or offtake from passage O connected therewith by means of a port P, conduit $O^h$ forming a continuation of said branch, and passage 17 formed in the casting K and connecting between conduit $O^h$ and the rear end of the bore in nozzle N. In the embodiment herein shown conduit $O^h$ extends from the casting K to the head 10 and back again thereby providing a long and tortuous passage between the oxygen passage O and the mixing chamber M which tends to prevent flashbacks from occurring in the blowpipe. The port P referred to above is under control of a hand operated throttle valve 18 by which the port may be opened or closed to any extent desired for determining the volume of oxygen normally supplied to the mixing chamber and the stem $18^a$ of valve 18 may be provided with a threaded connection $18^b$ between the stem and the wall of passage 14 whereby the valve will tend to remain in any position of adjustment for which it is set.

Flow of oxygen through passage O and conduit $O^c$ is under control of a valve $V^o$ and flow of fuel gas through passages F, 15, and conduit A is under control of a throttle valve $V^f$. Valve $V^o$ is slidably mounted in passage O and is normally held closed against its seat 19 by a spring 20 positioned between the valve and tube 12; the seat being held in the passage between a shoulder 22 and an annular locking screw 21 threaded into the passage. Valve $V^o$ is provided with a stem 23 which is slidably mounted in the bore of a plug 24 threaded into and forming a closure for the forward end of passage O. The valve $V^o$ is operated through its stem by means of a lever 25 pivoted at 26 in the casing 11 and having a shoulder 27 contacting with the end of the stem which projects forwardly beyond the plug 24 and the lever is operable from outside of casing 11 for opening valve $V^o$ by depression of a thumb button 30 connected thereto by a lug 28 extending through an aperture 29 in the casing. The lug is preferably slidable on the lever and is provided with a notch 31 engagable with the edge of the casing defining the aperture for locking the lever depressed and thereby holding valve $V^o$ open.

The port P is located on the intake side of valve $V^o$ in order that oxygen may be supplied to the mixing chamber independently of whether valve $V^o$ is open or closed and with this arrangement the preheating jet may be lighted before the oxygen jet is brought into operation. Obviously, the opening of valve $V^o$ will lower the gas pressure on its intake side while raising the pressure on its delivery side in passage O. In consequence, the quantity of gas passed through port P in unit time, will proportionately decrease and if valves 18 and $V^f$ are set to give a neutral flame, when valve $V^o$ is closed, opening of this valve will tend to cause the flame to become carbonizing, assuming the gas used has a carbon component as acetylene. On the other hand, if the valves 18 and $V^f$ are set to give a neutral flame when valve $V^o$ is open, closing of this valve will increase the pressure on the intake side thereof with a consequent increase in the quantity of gas passed through port P; tending, therefore, to produce an oxidizing flame. Neither a carbonizing or oxidizing flame is desirable for reasons given above and both are prevented in this invention by providing a second port or bleed passage $p$ between the oxygen passage O and passage 14 on the delivery side of valve $V^o$ and constituting a second offtake from passage O. This second port is preferably of smaller bore than port P and is controlled by a check valve 32 adapted to open automatically when gas pressure in passage O on the delivery side of valve $V^o$ rises above a predetermined amount. To this end, the check valve is yieldably pressed against its seat by compressible means, as a spring 33, the compression of which is adjustable as will herein presently appear. The pressure at which oxygen is supplied to the blowpipe varies widely in accordance with a number of factors, as for example the length and diameter of hose connection and the size of the tip. It may also vary in accordance with the thickness and other characteristics of the metal to be cut. Considering all of these variables practical working oxygen pressure may vary between 20 and 150 lbs. The fuel gases used for preheating purposes also vary in accordance with a number of factors, the variation in pressure thereof being independent of the variations in cutting oxygen pressures and is normally within a range of from ½ to 15 lbs. The pressure of oxygen in passage 14 may be approximately that of the fuel gas or probably a little greater and the pressure differential between the gas in passages O and 14 may be more than 16 to 1 which is quite sufficient to insure at all times automatic working of the check valve 32. It will be noted in this connection that the valve 32 is provided with a flat nose, the area of which is subject to pressure of oxygen in passage O whereas the effective opposing pressure on the top of this valve is proportional to the area of the base of the conical seat in which the valve rests when closed. The diameters of these areas are in a ratio of about 1 to 3 as will be apparent from inspection of Fig. 6 of the drawings. Obviously, the adjustment of the pressure of spring 33 may be between zero and its maximum.

The check valve 32 is preferably of the ball type; the seat therefor being of corresponding shape and preferably formed in a seat block 35 threaded into an aperture in the partition wall between passages 0 and 14. The check valve is provided with a tubular stem 36 adapted to receive in its bore one end of a spindle or pin 37 which is adjustably mounted in a bore through a plug 38 by means of a threaded connection 44 therebetween. The pin 37 is provided intermediate its ends with a flange 39 serving as an abutment for one end of spring 33, the other end of the spring pressing against a shoulder 40 provided on valve 32 around its stem 36. The plug 38 is counterbored at its lower end to accommodate the flange 39 and to provide a housing for spring 33 and the stem 36 of valve 32. The upper end of the pin 37 projects above the plug and is provided with a kerf 41 whereby a tool may be applied thereto for turning the pin in adjusting the compression of spring 33. A lock nut 43 is applied to the pin 37 at its upper end and serves to prevent the pin from shifting from its adjusted position. Plug 38 is engaged in the wall of passages 14 by a threaded connection and a cap 42 is threaded on the upper end thereof so as to enclose the projecting end of the pin to protect the same against accidental rotation. By the above construction it is apparent that the pressure of spring 33 on valve 32 may be varied so that the valve may be adapted for operation under such pressures as may be present in passage 0 under different working conditions.

It is believed that operation of the mechanism of the blowpipe of this invention is clear from the above description; the operation being, however, briefly as follows. When it is desired to use the torch, valves 18 and V$^f$ are first opened and adjusted to produce a neutral combustible mixture of gases after which the preheating jet is lit and applied to the region of metal to be severed until the metal has been raised to ignition temperature. The control valve V$^o$ for the cutting oxygen is then opened to supply a cutting jet whereupon the pressure in passage O will fall on the intake side of valve V$^o$ with a consequent decrease in quantity and density of gas passed through port P in unit time. This decrease according to this invention, is automatically compensated for by an additional volume of oxygen supplied to passage 14 through bleed passage $p$ located, as stated above, on the delivery side of valve V$^o$, the valve controlling the same being adjusted to yield to the increased pressure on this side when the valve V$^o$ is open so as to bleed a volume of gas therethrough exactly compensatory to the decrease in density of that delivered through port P and so that the amount of oxygen supplied to the mixing chamber will remain the same.

By means of a construction such as provided in the above described embodiment of the invention, the supply of oxygen to the mixing chamber is maintained substantially uniform and the deleterious results of an oxidizing and of a carbonizing preheating flame as set forth above are avoided.

I claim:

1. In combination, a member having a plurality of gas passages therethrough leading from separate sources of gas supply; a valve controlling the flow of gas through one of the passages; a port connecting the intake side of the valve in the valve controlled passage with another of the passages; a second port connecting the delivery side of the valve in the valve controlled passage and said other passage; and means controlling the flow of gas through said ports responsively to pressure changes in the valve controlled passage.

2. In combination, a member having a plurality of gas passages therethrough; a valve controlling the flow of gas through one of the passages; a port forming constant communication between said valve controlled passage on the intake side of the valve and another of the passages; and a port between said valve controlled passage on the delivery side of the valve and said other passage; and pressure responsive means controlling said second port under influence of pressure changes in the valve controlled passage.

3. In combination, a member having gas passages therethrough; a valve controlling the flow of gas through one of the passages; means for passing gas from the intake side of the valve in the valve controlled passage to another of the passages; supplementary means for passing additional gas from the valve controlled passage to the other passage; and means controlling the passage of gas through the supplementary means operable automatically under influence of pressure in the valve controlled passage.

4. In combination, a member having gas passages therethrough; a valve controlling the flow of gas through one of the passages; means for passing gas from the intake side of the valve controlled passage to another of the passages; a second means for passing additional gas from the valve controlled passage to the other passage; and means responsive to the gas pressure in the valve controlled passage for controlling the passage of gas through the second means.

5. In combination, a member having gas passages therethrough; a valve controlling the flow of gas through one of the passages; means for passing gas from the intake side of the valve in the valve controlled passage to another of the passages; a port for passing additional gas from the valve controlled passage to the other passage; and a valve in the port responsive to gas pressure in the valve controlled passage for controlling the passage of gas through the port.

6. In a blowpipe, the combination with a member having an oxygen passage, and a fuel passage therethrough; of a valve for controlling the passage of oxygen through the oxygen passage; an offtake from the oxygen passage to the fuel passage on the intake side of the valve; a further offtake from the oxygen passage to the fuel passage on the delivery side of the valve; and valve means automatically operable under pressure in the oxygen passage for controlling the flow of oxygen through the second named offtake.

7. In combination with a member having gas passages therethrough connected with separate sources of gas supply; means for passing gas from one of said passages to another; a port connecting the passages for passing supplemental gas from one of the passages to another; and a check valve in control of said port; the port and check valve being constructed and arranged so that the check valve will operate to vary the amount of supplemental gas passed responsively to a change in gas pressure in the passage from which the gas is passed.

8. In combination with a member having gas passages therethrough each connected with a source of gas supply; means for passing gas from one of said passages to another; a port connecting the passages for passing supplemental gas between the passages; and a pressure responsive valve in control of said port operable under influence of gas pressure changes in the passage from which gas is passed.

9. In combination with a member having gas passages therethrough; ports forming communication between said passages; a valve in one of the passages between said ports; and a check valve controlling the port on the delivery side of the first named valve.

10. In combination with a member having gas passages therethrough; ports forming communication between said passages; a valve in one of the passages between said ports; and a pressure operated valve controlling the port on the delivery side of the first-named valve operable under influence of pressure in said valve controlled passage.

11. In combination with a member having gas passages therethrough; ports connecting said passages; a valve in one of the passages between said ports; and means in the port on the delivery side of the valve automatically operable by pressure in the valve controlled passage for controlling flow of gas through the port in which it is mounted.

12. In a blownpipe, the combination of a member having gas passages therethrough leading from separate sources of gas supply; a valve controlling the flow of gas through one of said passages; a pair of ports connecting the passages and arranged respectively on the inlet and outlet side of said valve; and means controlling the flow of gas through the port on the outlet side of the valve responsively to variations in gas pressure in the valve controlled passages.

13. In a blowpipe construction, the combination of a member having passages for oxygen gas and a passage for fuel gas therethrough; means for passing oxygen from the oxygen passage to the fuel passage; a valve in the oxygen passage for controlling the flow of oxygen therethrough; and means on the discharge side of the valve operable automatically when said valve is open to pass supplemental oxygen to the fuel gas passage.

FRANK C. GEIBIG.